US005317473A

United States Patent [19]

Lundquist et al.

[11] Patent Number: 5,317,473

[45] Date of Patent: May 31, 1994

[54] SURGE ARRESTER ASSEMBLY

[75] Inventors: Jan Lundquist; Lennart Stenström; Sven Akervall, all of Ludvika, Sweden

[73] Assignee: Asea Brown Boveri AB, Västerås, Sweden

[21] Appl. No.: 937,410

[22] Filed: Aug. 31, 1992

[30] Foreign Application Priority Data

Sep. 16, 1991 [SE] Sweden ................................ 9102694

[51] Int. Cl.[5] ................................................ H02H 9/06

[52] U.S. Cl. .................................... 361/117; 361/126; 361/132

[58] Field of Search ............... 361/117, 126, 127, 132, 361/137

[56] References Cited

U.S. PATENT DOCUMENTS

| | | | |
|---|---|---|---|
| 1,497,978 | 6/1924 | Jacobs | 361/126 |
| 3,601,632 | 8/1971 | Frazier | 307/219 |
| 4,940,961 | 7/1990 | Thuries et al. | 361/117 |
| 5,124,872 | 6/1992 | Pham et al. | 361/132 |

*Primary Examiner*—Todd De Boer
*Attorney, Agent, or Firm*—Watson, Cole, Grindle & Watson

[57] ABSTRACT

The invention relates to a surge arrester assembly with a plurality of parallel-connected arrester units (1) with polymer casing mounted in a rack. The lower and upper parts of the rack consist of bars (4*a*, 4*b*) of, for example, aluminium, which are included in the electric circuit. The bars are retained by, for example, support insulators (6) of porcelain or polymer material. The mechanical retention of the stacks of ZnO blocks of the arrester units (1) and the necessary contact pressure between the blocks are ensured by the rack structure. The electrical connections (23, 24) to the rack are arranged in such a way that, if a fault causing a short circuit in one of the block stacks occurs, the arc produced is blown by the current forces along the bars to the opposite end, where arcing horns (38) of a current-resistant material, for example steel, are arranged and where the arc may burn in a controlled manner without involving a risk to the environment. (FIG. 1 )

7 Claims, 6 Drawing Sheets

SURGE ARRESTER ASSEMBLY

BACKGROUND OF THE INVENTION

The present invention relates to a surge arrester assembly comprising a plurality of parallel-connected surge arrester units, each comprising a stack of a plurality of cylindrical arrester elements, preferably made of metal oxide varistor material, for example ZnO blocks, which are arranged one after the other in the axial direction of the arrester elements between two end electrodes and are surrounded by an elongated outer casing of polymeric material.

In connection with applications which require parallel connection of a great number of ZnO blocks, as, for example, for protection of series capacitors or the neutral bar in a high voltage direct current (HVDC) station, the enclosure constitutes a significant part of the arrester cost since both mechanical and electrical demands are placed thereon.

SUMMARY OF THE INVENTION

One object of the present invention is to provide a surge arrester assembly of the above-described kind, in which the cost of the enclosure of the arrester units can be considerably reduced. This is achieved according to the invention by a design with the characteristic features described in the characterizing part of claim 1. The special rack design included in the invention can, in a cost-effective manner, mechanically retain a large number of parallel stacks of ZnO blocks and provide the necessary contact pressure for the blocks. In this way, it is not necessary to place any special mechanical demands on the casings of the block stacks, but the stacks need only be provided with a surface protective layer, preferably of a shrinkable polymer, to electrically withstand an outdoor environment.

By a specially suitable further development of the invention, the consequencies of a possible failure on one or more of the ZnO stacks are minimized. This is achieved by designing the rack such that electrically parallel-connected rows of ZnO stacks are parallel-connected only at one point so as to prevent current supply from more than one direction, and by locating the electrical connections to the rack in such a way that, in case of overload of one of the block stacks, that is, when a short circuit occurs, antiparallel current paths are obtained and the arc created is blown by the current forces along the rack to the opposite side where the end connections are provided with arcing horns of a current-resistant material, for example steel, and where the arc may burn in a controlled manner without entailing a risk to the environment.

An advantage of the arc blowing is also that the connections to the respective block stack need not be dimensioned for the full duration of the expected short-circuit current. Nor is the polymer material exposed to direct influence of the arc for the whole short-circuit time, whereby the consequences of a failure are limited.

Since the rack provides the necessary mechanical support, the polymer layer on the block stacks can be minimized and be selected from a type which, for example, experiences deteriorated mechanical properties at high temperatures (120–150° C.). This considerably improves the cooling of the ZnO blocks and reduces the necessary time between repeated energy stresses. The capacity to manage high temporary overvoltages can thus be considerably increased.

To avoid all discontinuities in the connection of the block stacks to the support bars and hence facilitate the arc blowing along the rack, special metallic bars can be arranged between the end electrodes of the block stacks according to a further development of the invention.

DESCRIPTION OF THE DRAWINGS

The invention will be explained in greater detail by the description of embodiments with reference to the accompanying drawings, wherein.

DESCRIPTION OF THE PREFERRED EMBODIMENTS

The surge arrester assembly shown in FIGS. 1-4 comprises ten electrically parallel-connected surge arrester units 1. Each such unit comprises a stack of arrester elements, preferably in the form of circular-cylindrical ZnO blocks. The block stack is provided with end electrodes 2 of metal and is surrounded by an insulating casing 3 made of a shrinkable polymeric material. This casing is directly applied to the block stack by shrinkage, thus obtaining a tight contact between the casing and the arrester elements.

The ten arrester units are mounted in a rack, in which they are arranged in parallel adjacent to each other in two parallel rows with five arrester elements in each row. The arrester units included in such a row are squeezed between two parallel support beams 4*a*, 4*b* of metal, which also attend to the electrical parallel connection of the arrester units. In the embodiment shown, these beams consist of square aluminium sections. The support beams 4*a*, 4*b* are retained by support insulators 6 of porcelain or polymer material.

Figure 5:
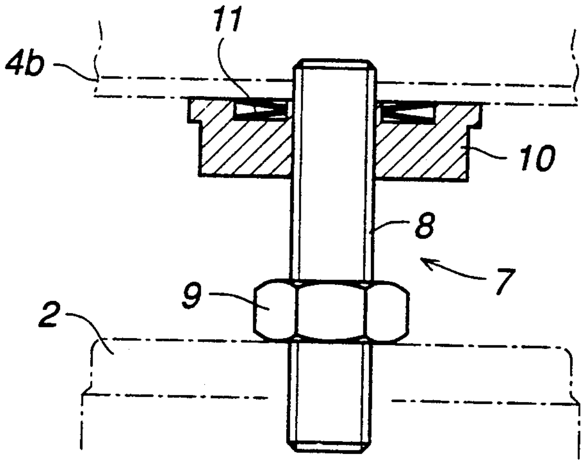
FIG. 5 shows a connection member for attaching surge arrester units to a retaining rack included in the assembly according to FIG. 1, FIGS. 6, 7 and 8 show connection parts in the rack of the assembly.

The electrical connection of the end electrodes 2 of the arrester units to the two support beams 4*a*, 4*b* is brought about with the aid of special press members 7, which at the same time ensure sufficient clamping force. FIG. 5 shows how such a press member is designed. It consists of a pin bolt 8 which is fixed by means of a nut 9 to the end electrode 2 of the arrester unit. The free end of the pin bolt slides into a bored hole in the support beam 4*b* and supports a nut 10 which is provided with an annular recess in which two opposed disc springs 11 are arranged. During assembly, the nut 10 is tightened until the disc springs make contact, which, independently of any ageing of beams and temperature variations etc., causes a sufficient pressure to be maintained on the block stacks.

The lower support beams 4*a*, 5*a* in the two rows are fixedly mounted on two transverse foot beams 12*a*, 12*b* which are supported by support insulators 13 arranged on a mounting base.

Figure 6:
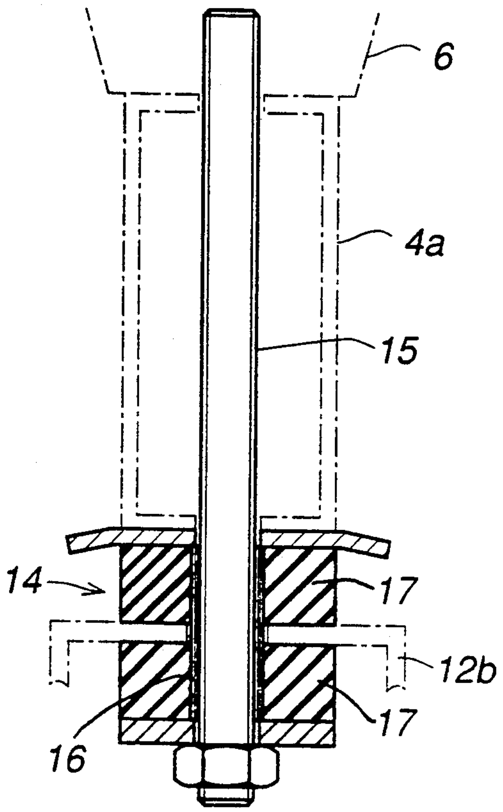
Figure 7:
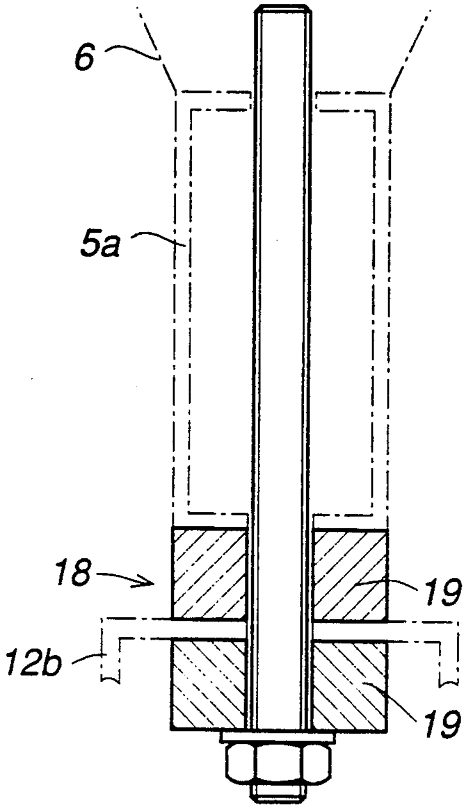

The attachment of the foot beams to the lower support beams 4*a*, 5*a* is made with an insulating connection member 14 at one end of the foot beams and an uninsulated connection member 18 at the other end of the beams. FIG. 6 shows the design of the insulating connecting member. It consists of a pin bolt 15 which is screwed into the lower end armature of the support insulator 6 and which extends through bored holes in the support beam 4*a* and the foot beam 12*b*. The electrical insulation between the beams 4*a* and 12*b* is achieved with the aid of an insulating sleeve 16 which is arranged around the bolt and which, in its turn, is surrounded by two hollow-cylindrical insulating elements 17, which are each arranged on a respective side of the foot beam. In the uninsulated connection member 18, which is shown in FIG. 7, the insulating elements 17 are replaced by spacers 19 of aluminium. The foot beams 12*a* and 12*b* may alternatively be made of an insulating material, in which case the insulating elements 16, 17 and the spacers 19 may be omitted.

At one end of the two rows of arrester units, a lower and an upper connection bar 21 and 22, respectively, are arranged. The upper connection bar 22 connects both electrically and mechanically the two upper rack beams 4*b*, 5*b*, whereas the lower connection bar 21 in the same way connects the two lower rack beams 4*a*, 5*a*. In the center of the connection bars 21, 22, connection members 23, 24 are arranged for connecting the arrester assembly to the object to be protected.

Figure 8:
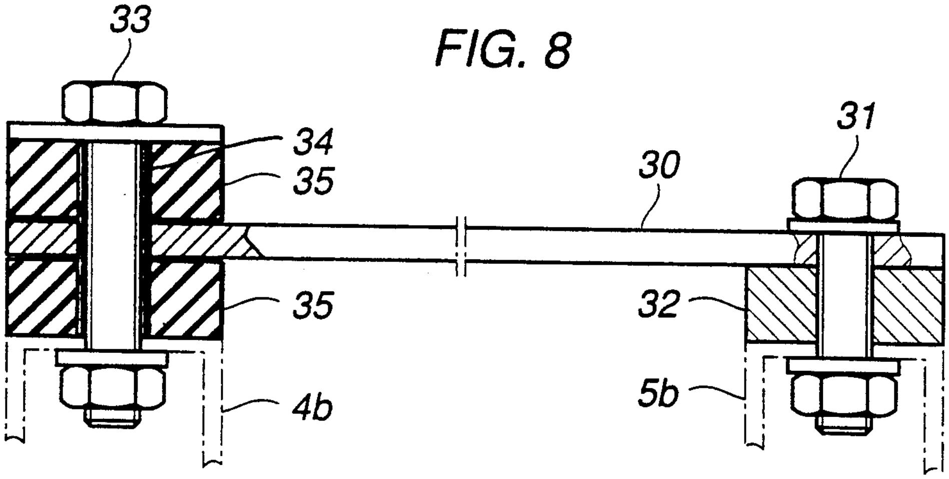

At the other end of the two rows of arrester units, the upper rack beams 4*b*, 5*b* are mechanically connected to each other by means of a connection bar 30, as shown in FIG. 8.

The connection bar 30 is at one end electrically connected to one of the rack bars 5*b* by a fixing bolt 31 and a metallic spacer 32. At its other end the connection bar 30 is attached in an insulated manner to the other support bar 4*b* with the aid of a bolt 33 which is surrounded by an insulating tube 34 and two cylindrical insulating elements 35. The bar 30 can alternatively be made of an insulating material, in which case the insulating elements 34, 35 and the spacer 32 may be omitted.

If a fault should occur inside an arrester unit with an ensuing short-circuit arc, the polymer casing of the arrester unit will burst and the arc commutates to the outside of the arrester unit. Because the foot beams 12*a*, 12*b* and the connection bar 30 are in electrical contact only with the support bars in one of the two parallel rows of arrester units, the current supply to the short-circuit arc will take place only from one direction. Since the currents in the support bars in the faulty row thereby become antiparallel, the arc will be influenced by electromagnetic forces which rapidly move it along the support bars to arcing horns 38 at the ends of the support bars.

Figure 1:
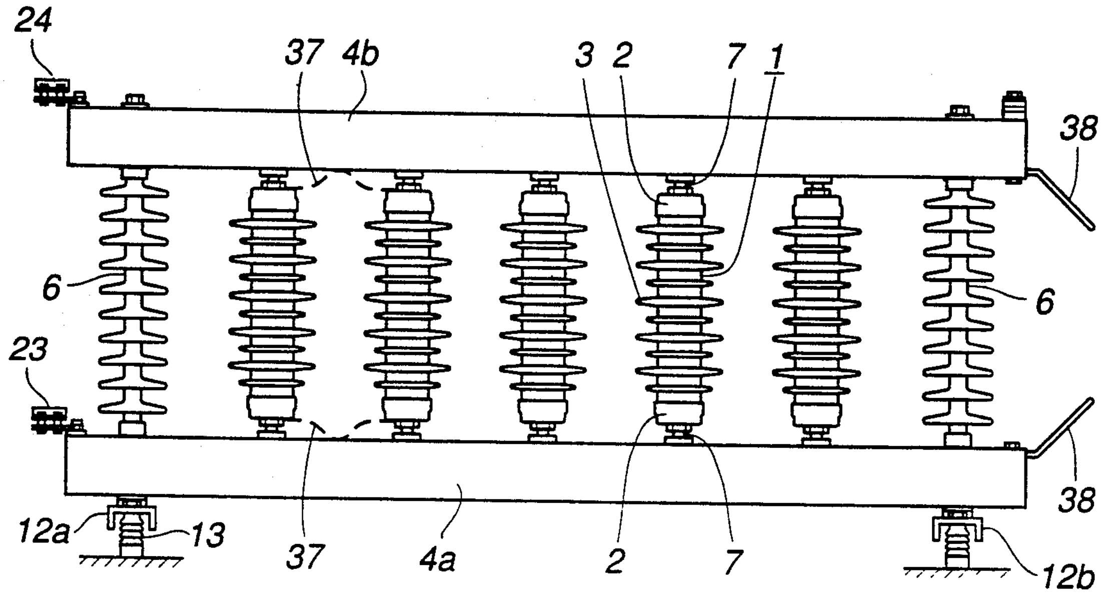
FIG. 1 shows in side view a first embodiment of a surge arrester assembly designed according to the invention.
Figure 2:
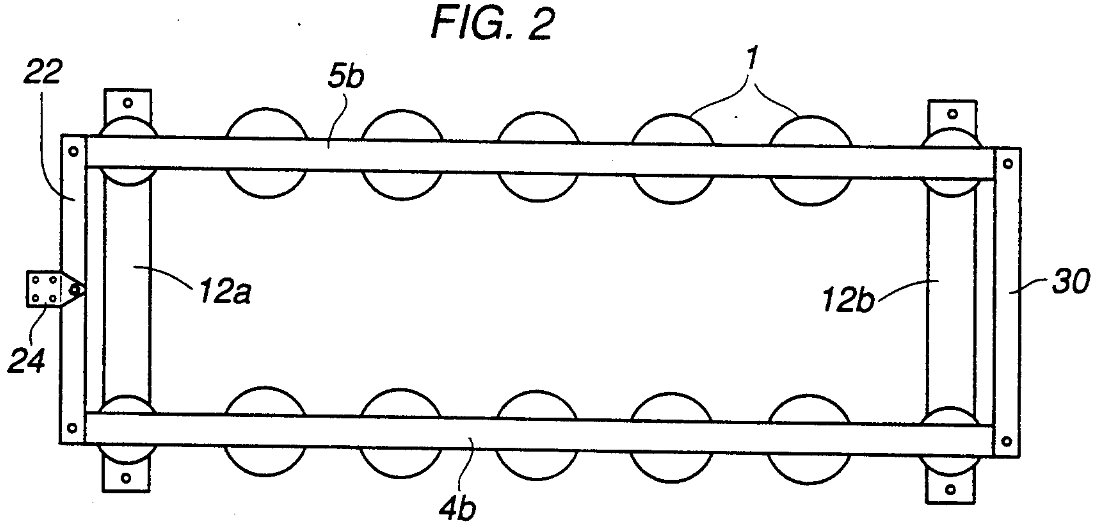
FIGS. 2, 3 and 4 show the assembly according to FIG. 1 in views from above (FIG. 2), from the left (FIG. 3) and from the right (FIG. 4), respectively.
Figure 4:
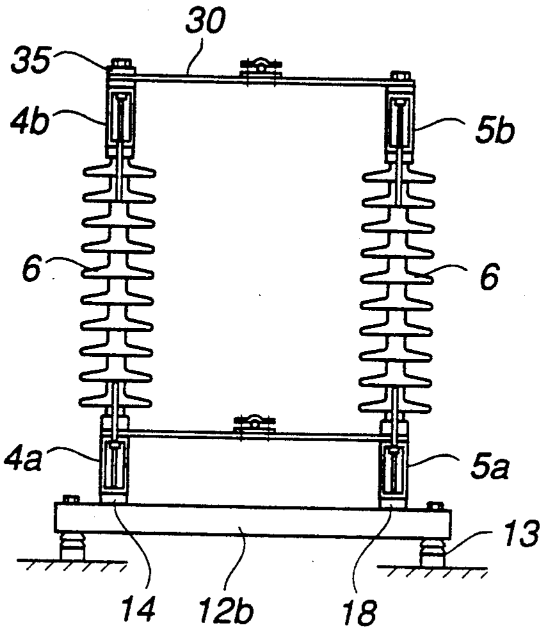
Figure 3:
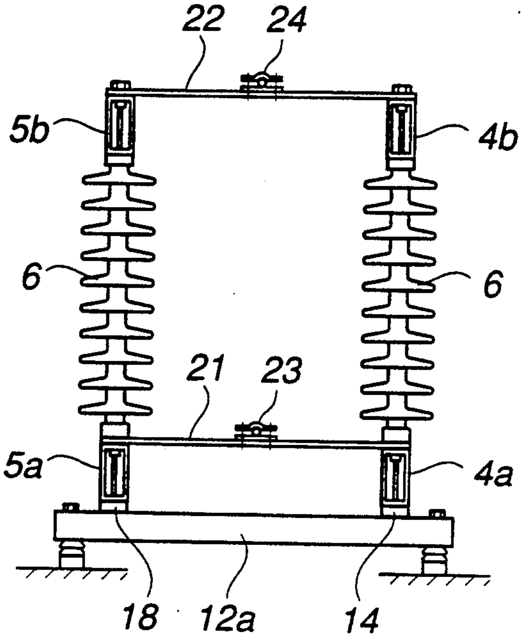

To bridge discontinuities in the arcing path and thereby facilitate the arc travelling, special metallic bars may be arranged between the end electrodes of the surge arrester units. FIG. 1 shows examples of two such metallic bars 37, indicated in dashed lines.

Figure 11:
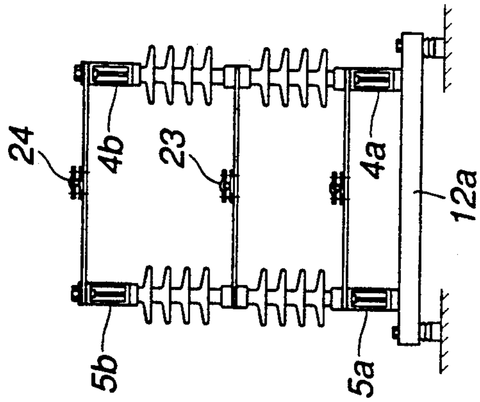
FIGS. 9, 10 and 11 show a second embodiment of a surge arrester assembly designed according to the invention in views from the side (FIG. 9), from above (FIG. 10), and from the left (FIG. 11), respectively.
Figure 9:
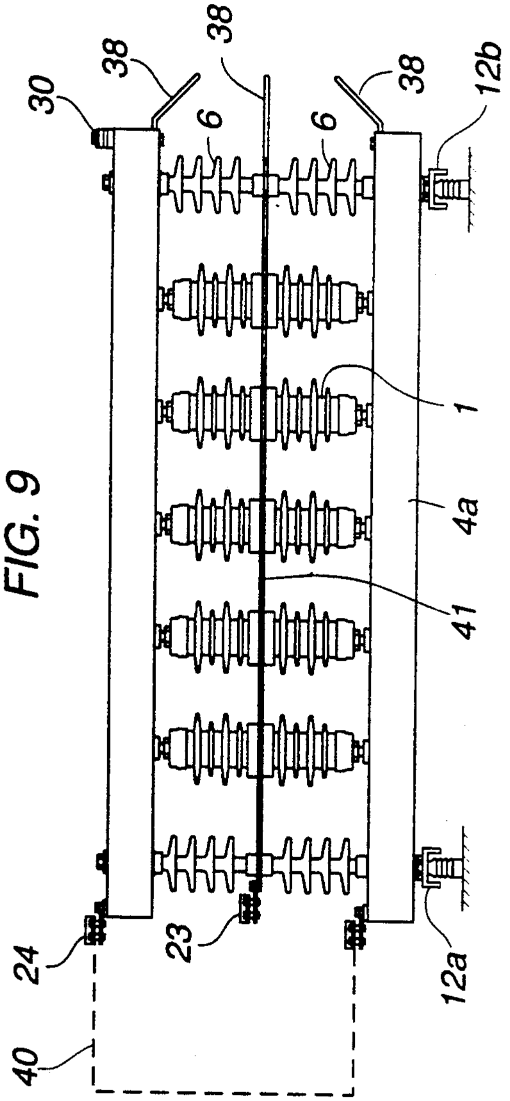
Figure 10:
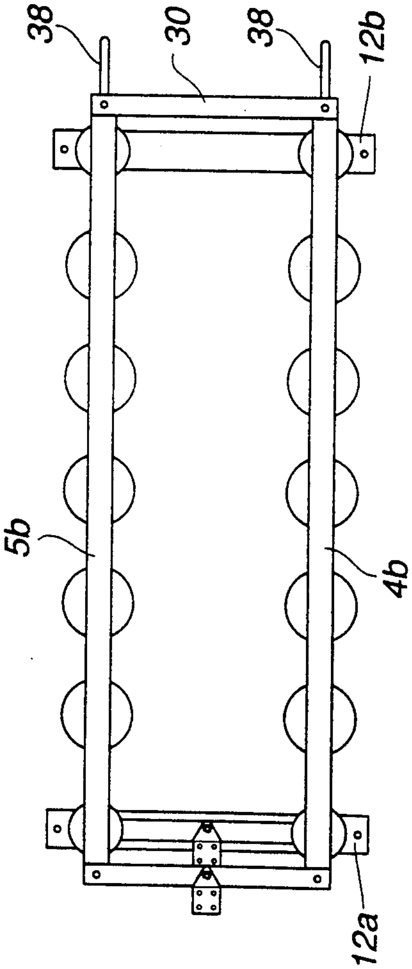

The second embodiment of a surge arrester assembly according to the invention shown in FIGS. 9–11 comprises 20 parallel-connected arrester units 1 which are arranged pairwise in groups, in which the two units in each groups are mounted on top of each other and together squeezed in between two support beams 4*a*, 4*b*, which are held together by means of support insulators 6. The assembly is made with two parallel rows of arrester groups with five groups in each row. At one end of the rows, referred to below as the connection end, all the four support beams 4*a*, 4*b*, 5*a*, 5*b* are connected together by an external connection 40 and together form one of the connection poles in the parallel connection. The other connection pole is formed of a separate conductor 41 which connects the connection points between the two arrester units in different groups. The foot beam 12*b* and the connection bar 30, which each separately mechanically connect the two lower support beams 4*a*, 5*b* and the two upper support beams 4*b*, 5*b*, respectively, at that end of the rows which is located furthest away from the connection end, are in electrical contact with only one of the rows. In that way, current supply from two directions to a possible short-circuit arc is avoided. At the same end of the rows, all the rack beams 4*a*, 4*b*, 5*a*, 5*b* and the ends of the separate conductor 41 are provided with arcing horns 38.

Figure 14:
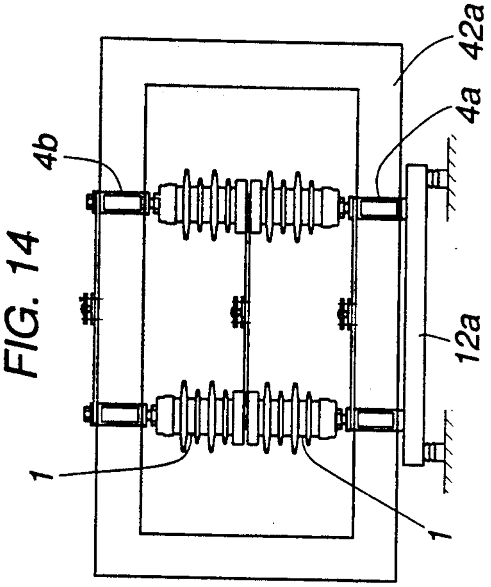
FIGS. 12, 13 and 14 show in the same way as in FIGS. 9-11 a third embodiment of such a surge arrester assembly.
Figure 12:
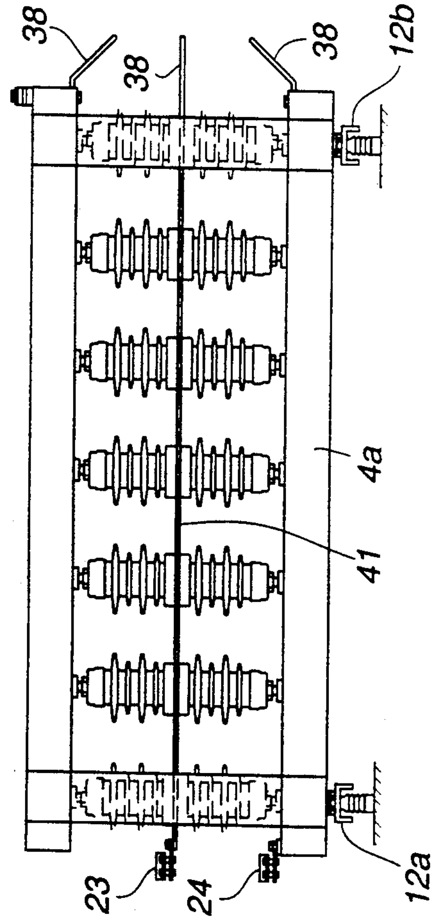
Figure 13:
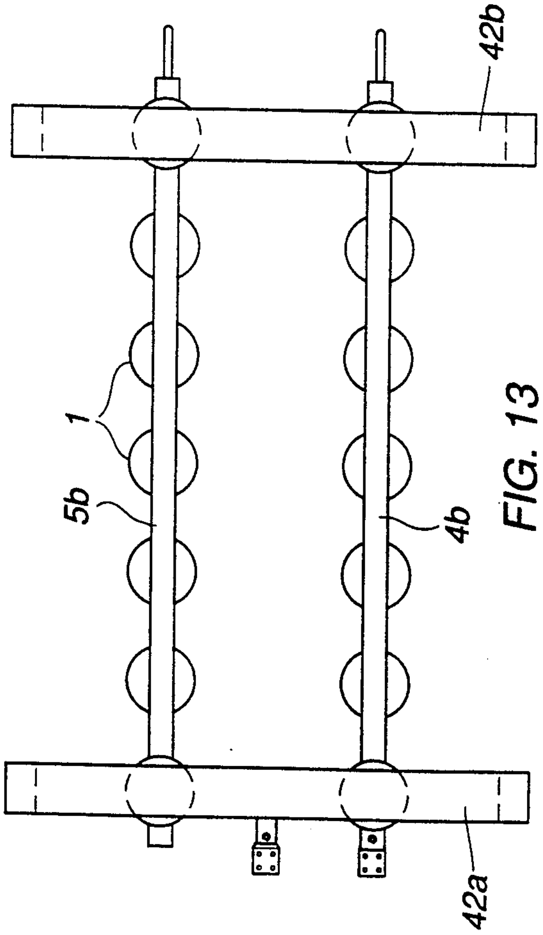

The surge arrester assembly shown in FIGS. 12–14 comprise 28 parallel-connected arrester units 1 which are arranged pairwise in groups in the same way as in the device according to FIGS. 9–11. In the embodiment according to FIGS. 12–14, no support insulators are needed to retain the structure, but the support beams 4*a*, 4*b*, 5*a*, 5*b* are retained with the aid of metallic frames 42*a*, 42*b* at the ends of the rack. The metallic frame 42*b* and the foot beam 12*b* at that end of the rack which is located furthest away from the connection end are in electrical contact with only one of the support beams in one of the rows to avoid current supply from two directions.

Figure 17:
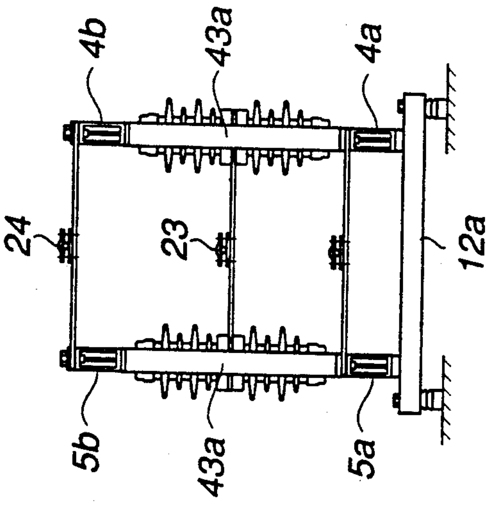
FIGS. 15, 16 and 17 show in the same way as in FIGS. 9-11 a fourth embodiment of a surge arrester assembly according to the invention.
Figure 15:
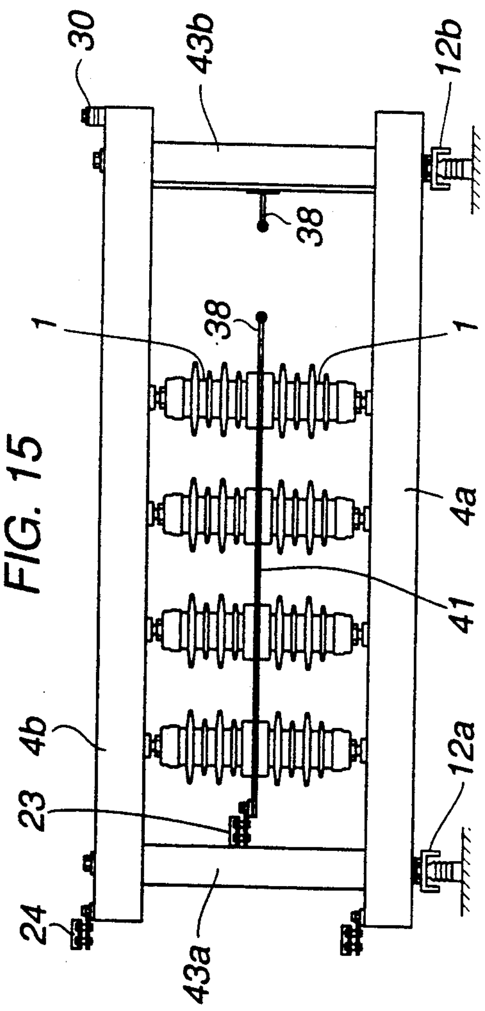
Figure 16:
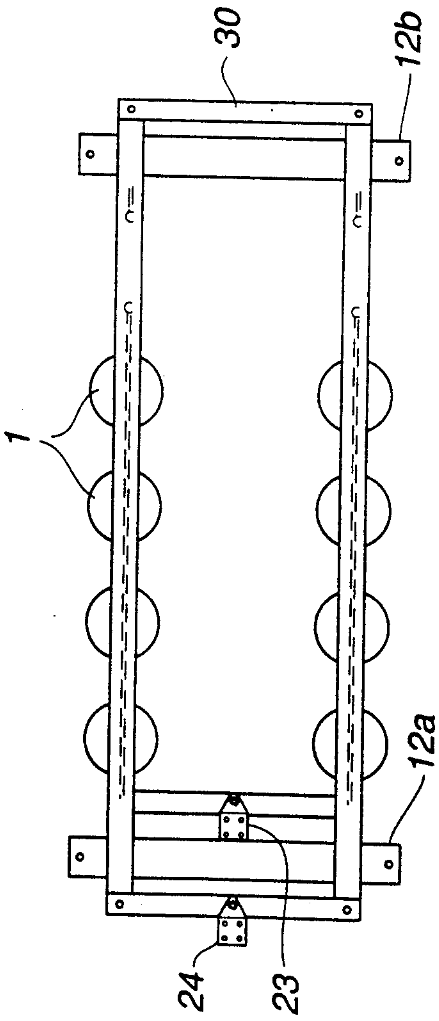

The arrester assembly shown in FIGS. 15–17 comprises 16 parallel-connected arrester units 1 which are arranged pairwise in groups in the same way as in the device according to FIGS. 9 and 10. In the embodiment according to FIGS. 15–17, the support beams 4*a*, 4*b*, 5*a*, 5*b* are retained with the aid of vertical connection beams 43*a*, 43*b* of metal at the ends of the support beams. The foot beam 12*b*, the connection bar 30 and the connection beams 43*b* are in electrical contact

What is claimed is:

1. A surge arrester assembly, comprising:

a plurality of parallel-connected surge arrester units, each of which comprises a stack of a plurality of cylindrical arrester elements made of metal oxide varistor material, each of said arrester units being arranged in a line in the axial direction of the arrester assembly between two electrodes and surrounded by an elongated outer casing of polymeric material;

the arrester units being arranged in parallel adjacent to each other in one or more rows so that those arrester units which are included in such a row are squeezed in the axial direction between two parallel metal support beams fixedly connected to each other by connecting elements extending between the beams; and connection members for connection of the arrester assembly into an electric network are connected to the support beams at the end of one row.

2. An assembly according to claim 1, wherein the support beams are provided with arcing horns at the other end of the row.

3. An assembly according to claim 2, comprising two or more rows of arrester units arranged adjacent to each other, wherein the support beams of the different rows are mechanically connected to each other by electrically insulating as well as unisulating connection members in such a way that the current supply to a possible short-circuit arc across an arrester unit can take place from one direction only, the arc being forced by the action of electromagnetic forces towards the arcing horn of the faulty row.

4. An assembly according to claim 1, wherein said connecting elements consist of support insulators.

5. A surge arrester assembly, comprising:

a plurality of parallel-connected surge arrester units, each of which comprises a stack of a plurality of cylindrical arrester elements, made of metal oxide varistor material, arranged one after the other in the axial direction of the arrester elements between two end electrodes and surrounded by an elongated outer casing of polymeric material;

said surge arrester units being arranged in arrester groups, each of said arrester groups comprising two coaxially superposed arrester units, said arrester groups being arranged in parallel adjacent to each other in one or more rows, whereby those arrester groups which are included in such a row are squeezed in the axial direction between two parallel support beams of metal, which are fixedly connected to each other with the aid of connecting elements extending between the beams; and the two support beams in each row of such groups being both electrically and mechanically connected to each other and forming one of the connecting poles in the parallel connection, the connection points between the two arrester units in the different groups being interconnected through a separate conductor which forms the other connecting pole in the parallel connection, said connecting poles being provided with connection members for connection of the arrester assembly into an electric network, said connection members being located at one end of said rows.

6. An assembly according to claim 1, wherein both the separate conductor and each one of the support beams are provided with arcing horns at their ends located furthest away from the connection members.

7. An assembly according to claim 1, wherein said connecting elements are made of a metallic material.

* * * * *